UNITED STATES PATENT OFFICE.

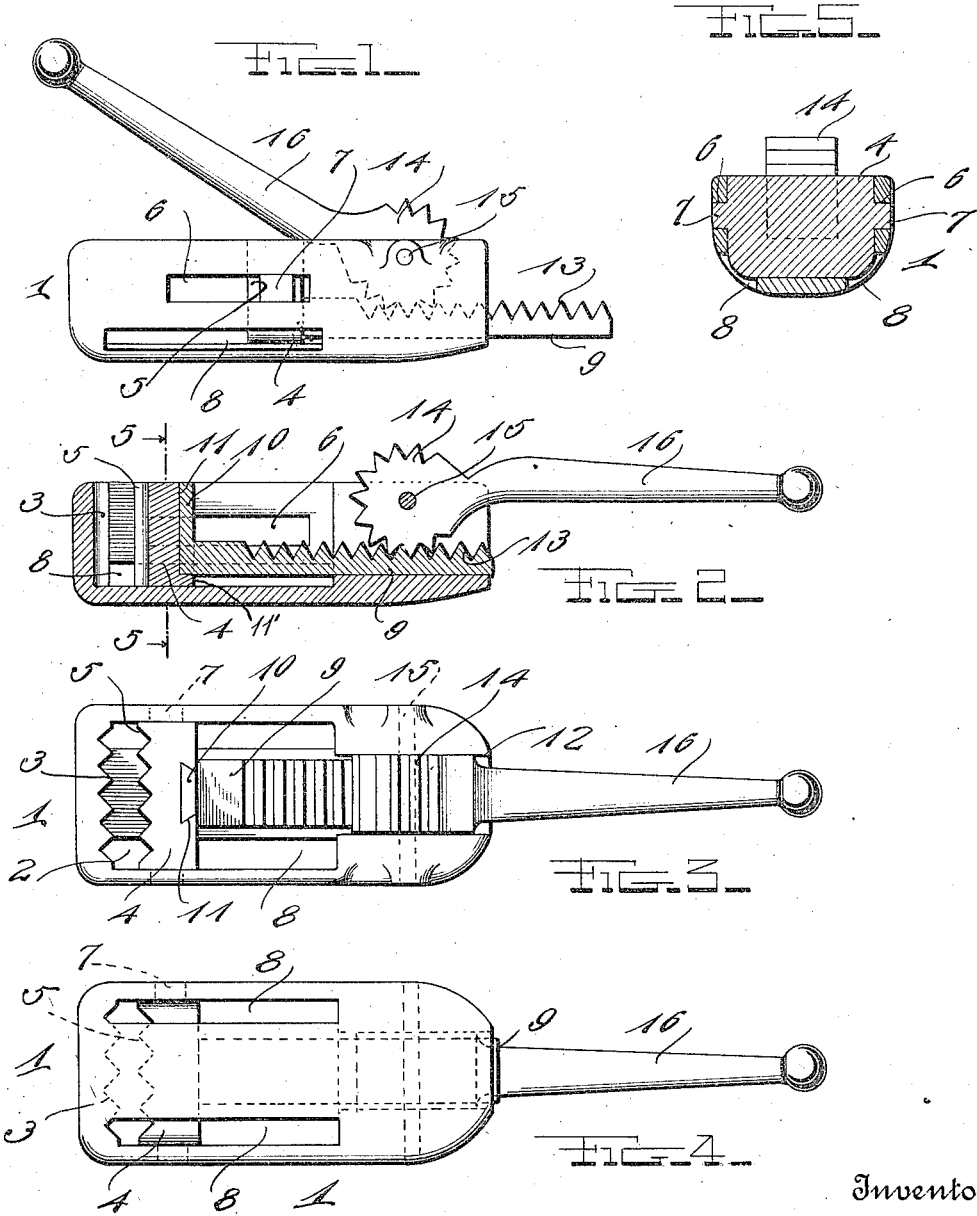

MARYAN DOLENGA, OF ST. LOUIS, MISSOURI.

NUTCRACKER.

1,093,549.  Specification of Letters Patent.  Patented Apr. 14, 1914.

Application filed January 27, 1913. Serial No. 744,562.

*To all whom it may concern:*

Be it known that I, MARYAN DOLENGA, a citizen of the United States, residing at St. Louis, in the State of Missouri, have invented certain new and useful Improvements in Nutcrackers; and I do declare the following to be a full, clear, and exact description of the invention, such as will enable others skilled in the art to which it appertains to make and use the same.

This invention relates to improvements in nut crackers.

One object of the invention is to provide a nut cracker having an improved construction and arrangement of nut holding and plunger supporting frame in which a nut is securely held while the plunger is projected into engagement therewith.

Another object is to provide an improved construction and arrangement of lever actuated plunger projecting mechanism whereby the plunger may be projected with great force into engagement with the nut to crack the same.

With these and other objects in view, the invention consists of certain novel features of construction, and the combination and arrangement of parts as will be more fully described and claimed.

In the accompanying drawings, Figure 1 is a side view of my improved nut cracker showing the plunger retracted; Fig. 2 is a vertical longitudinal sectional view thereof, showing the plunger in a projected position; Fig. 3 is a top plan view with the parts in the position shown in Fig. 2; Fig. 4 is a bottom plan view of the same; Fig. 5 is a cross sectional view on the line 5—5 of Fig. 2.

My improved nut cracker comprises a nut receiving and plunger supporting frame 1 which may be of any suitable shape and which is here shown as of substantially oblong form having its corners rounded. In the outer portion of the frame is formed a nut receiving and plunger supporting opening 2 the inner surface of the outer end wall of which is serrated or provided with teeth 3 which serve to hold the nut from slipping when forced into engagement therewith by the plunger 4 which is slidably mounted in said opening and has its outer end serrated or provided with teeth 5 which co-act with the teeth 3 to firmly grip and hold the nut while being cracked.

In the sides of the outer portion of the frame are formed parallel longitudinally disposed guide slots 6 with which are slidably engaged guide lugs 7 on the sides of the plunger whereby the latter is guided in its reciprocating movement in the frame. In the bottom or lower side of the outer portion of the frame communicating with the opening 2 are longitudinally disposed slots 8 through which particles of shell may freely drop from the opening 2 and will thus be prevented from interfering with the free movement of the plunger in said opening.

The numeral 9 designates a tail shaped lug 10 which is engaged with a similarly shaped recess 11 in the plunger, the lower end of said recess being closed by a lip 11' which prevents the plunger from becoming disengaged from the bar. The latter extends back through a guide passage 12 formed in the inner portion of the frame and on the upper side of said bar are rack teeth 13 with which is engaged a plunger operating gear or toothed head 14 which is arranged between the walls of the guide passage 12 and is pivotally mounted on a pivot pin 15 which passes through the rear end of the frame 1 as shown. On the head or gear 14 is an integral operating lever or handle 16 by means of which the gear is rocked in one direction or the other for reciprocating the bar 9 and plunger 4. When the lever is swung outwardly and forced downwardly the plunger 4 will be projected into forcible engagement with a nut placed in the opening 2 thus crushing the shell of the nut between the plunger and the teeth 3 on the end of the opening 2. When the lever 16 is swung in the opposite direction, the plunger will be retracted. This operation of the lever and the plunger is clearly illustrated in Figs. 1 and 2 of the drawings.

By connecting the bar 9 and plunger 4 as herein described, when it is desired to separate the parts the pivot pin 15 is driven out and the rack bar lifted out of the guide passage 12, its dove-tailed lug 10 meanwhile being raised out of the recess 11 and off of the lip 11'. The teeth on the bar and those on the head may then be cleaned, or sharpened in case they have become nicked; and finally the parts are restored by a reversal of the operation just described. Care should be taken when restoring the parts to set the plunger 4 at such a distance from the outer end of the frame when the handle 16 is thrown outward as seen in Fig. 2, as will be slightly less than the diameter of the smallest nut, although I would leave some space between these parts so that the nut will not be mashed when it is cracked. In replacing the parts the dove-tailed lug 10 passes down into the recess 11 and the rack bar 9 passes down into the guide passage 12, and the toothed head when replaced and held in position by the pivot pin 15 prevents the dislocation of the bar and hence its disconnection from the plunger.

By constructing the frame 1 of the cracker as herein shown and described it will be seen that the same may be readily held in one hand, while the plunger projecting mechanism is operated by the other hand to force the plunger against a nut placed in the frame and crack the nut. The cracker when constructed in this manner will be sufficiently powerful to crack most kinds of nuts, and at the same time is small enough to be carried in the pocket if desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The herein described nut cracker comprising a hollow frame having oppositely positioned guide slots formed in the vertical longitudinal walls thereof, a plunger slidably mounted in said frame and having lugs projecting from the opposite sides thereof for sliding engagement with said slots, an upstanding dove-tail shaped lug forming a part of said plunger, a block detachably secured to said upstanding lug, and provided with serrations in its operating face, a lip forming an integral part of the block and adapted for engagement with the lower face of the plunger and bottom of the frame, whereby said plunger is properly guided and the block held in operative position, the forward end of said frame being also serrated, and means for reciprocating said plunger whereby the block is moved to and from the serrated closed end of the frame.

In testimony whereof I have hereunto set my hand in presence of two subscribing witnesses.

MARYAN DOLENGA.

Witnesses:
ANTHONY ROGALSKI,
JOHN DOLENGA.